United States Patent
Li et al.

(10) Patent No.: US 9,026,510 B2
(45) Date of Patent: May 5, 2015

(54) CONFIGURATION-LESS NETWORK LOCKING INFRASTRUCTURE FOR SHARED FILE SYSTEMS

(75) Inventors: Jinyuan Li, Mountain View, CA (US); Murali Vilayannur, San Jose, CA (US); Mayank Rawat, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 547 days.

(21) Appl. No.: 13/037,808

(22) Filed: Mar. 1, 2011

(65) Prior Publication Data
US 2012/0226673 A1     Sep. 6, 2012

(51) Int. Cl.
*G06F 7/00* (2006.01)
*G06F 17/30* (2006.01)
*G06F 11/07* (2006.01)

(52) U.S. Cl.
CPC ...... *G06F 17/30171* (2013.01); *G06F 11/0712* (2013.01); *G06F 11/0757* (2013.01)

(58) Field of Classification Search
CPC .............................. G06F 3/0622; G06F 3/0637
USPC .......... 707/801, 704, 821–831; 711/114, 117, 711/152, 209
See application file for complete search history.

(56) References Cited

U.S. PATENT DOCUMENTS

| | | | | |
|---|---|---|---|---|
| 5,226,163 | A * | 7/1993 | Karsh et al. | 1/1 |
| 2002/0161891 | A1* | 10/2002 | Higuchi et al. | 709/226 |
| 2005/0289143 | A1* | 12/2005 | Oshri et al. | 707/8 |
| 2006/0013078 | A1* | 1/2006 | Goodman et al. | 369/30.01 |
| 2006/0053111 | A1* | 3/2006 | Bradley | 707/8 |
| 2008/0120129 | A1* | 5/2008 | Seubert et al. | 705/1 |
| 2008/0140633 | A1* | 6/2008 | Holt | 707/3 |
| 2008/0184249 | A1* | 7/2008 | Adams et al. | 718/104 |
| 2008/0288498 | A1* | 11/2008 | Hinshaw et al. | 707/8 |
| 2010/0114889 | A1* | 5/2010 | Rabii et al. | 707/737 |
| 2010/0274772 | A1* | 10/2010 | Samuels | 707/693 |

\* cited by examiner

*Primary Examiner* — Mariela Reyes
*Assistant Examiner* — Linh Black

(57) ABSTRACT

A network-based method for managing locks in a shared file system (SFS) for a group of hosts that does not require any configuration to identify a server for managing locks for the SFS. Each host in the group carries out the steps of checking a predetermined storage location to determine whether there is a host ID written in the predetermined location. If there is no host ID written in the predetermined location, the first host to notice this condition writes its host ID in the predetermined location to identify itself as the server for managing locks. If there is a host ID written in the predetermined location, the host ID of the server for managing locks is maintained in local memory. When the host needs to perform IO operations on a file of the SFS, it communicates with the server for managing locks over the network using the host ID of the server for managing locks to obtain a lock to the file.

20 Claims, 8 Drawing Sheets

US 9,026,510 B2

CONFIGURATION-LESS NETWORK LOCKING INFRASTRUCTURE FOR SHARED FILE SYSTEMS

BACKGROUND

In a shared file system (SFS), a lock mechanism is employed to manage concurrent accesses to files from more than one server. Early SFSs relied on SCSI-2 reserve/release primitive commands to provide a server exclusive access to a logical storage volume that stored files of interest. Unfortunately, SCSI-2 reserve primitives are expensive as they lock the entire logical storage volume and input/output (IO) operations on the logical storage volume are not permitted so long as the SCSI-2 reserve primitive is in effect.

Virtual Machine File System (VMFS) is a proprietary SFS developed by VMware, Inc. of Palo Alto, Calif. VMFS introduces the notion of a disk lock that protects specific resources of the VMFS, e.g., files, bitmaps, etc. Rather than locking the entire logical storage volume using the SCSI-2 reserve primitive, a server can simply acquire a lock associated with the resource to which an IO operation needs to be performed. This significantly reduces the overall duration of a SCSI-2 reserve/release, as a SCSI-2 release may be issued immediately after a lock protecting a resource is updated as "locked." However, the scaling of this locking scheme remains a challenge.

SUMMARY

One or more embodiments of the present invention provide a network-based method for managing locks in an SFS. One feature of the network-based method according to embodiments of the present invention is that it can identify a server for managing locks without any configuration.

A method of managing locks in a shared file system (SFS) for a group of hosts, according to an embodiment of the present invention, includes the steps of writing a host ID in a predetermined location to identify the host that is acting as a server for managing locks, and communicating with said server for managing locks over a network to obtain locks to files of the SFS. Any of the hosts in the group can serve as said server for managing locks and once the host ID of said server for managing locks is written in the predetermined location, all other hosts in the group communicate with said server for managing locks to obtain locks to files of the SFS.

According to another embodiment of the present invention, each host in the group carries out the steps of checking a predetermined location to see whether or not there is a host ID written in the predetermined location. If there is no host ID written in the predetermined location, the first host to notice this condition writes its host ID in the predetermined location to identify itself as the server for managing locks. If there is a host ID written in the predetermined location, the host ID of said server for managing locks is maintained in local memory. When the host needs to perform IO operations on files of the SFS, it communicates with said server for managing locks over the network using the host ID of said server for managing locks stored in local memory.

According to a further embodiment of the present invention, in the event that one of the other hosts determines that its communication with a server for managing locks over the network has failed, the host posts a message in a data structure owned by said server for managing locks to employ an alternative locking technique that does not rely on communications with said server for managing locks over the network.

The said server for managing locks, in response to seeing the message in the data structure that it owns, posts a confirmation message to confirm use of the alternative locking technique, whereupon each of the hosts communicates with the SFS using the alternative locking technique. Upon successful reconnection with the original said server for managing locks over the network, each host in the group reverts back to the technique that relies on communications with said server for managing locks over the network.

Further embodiments of the present invention provide a non-transient computer readable storage medium that includes instructions for causing a computer system to carry out one or more of the methods set forth above.

DETAILED DESCRIPTION

Figure 1:
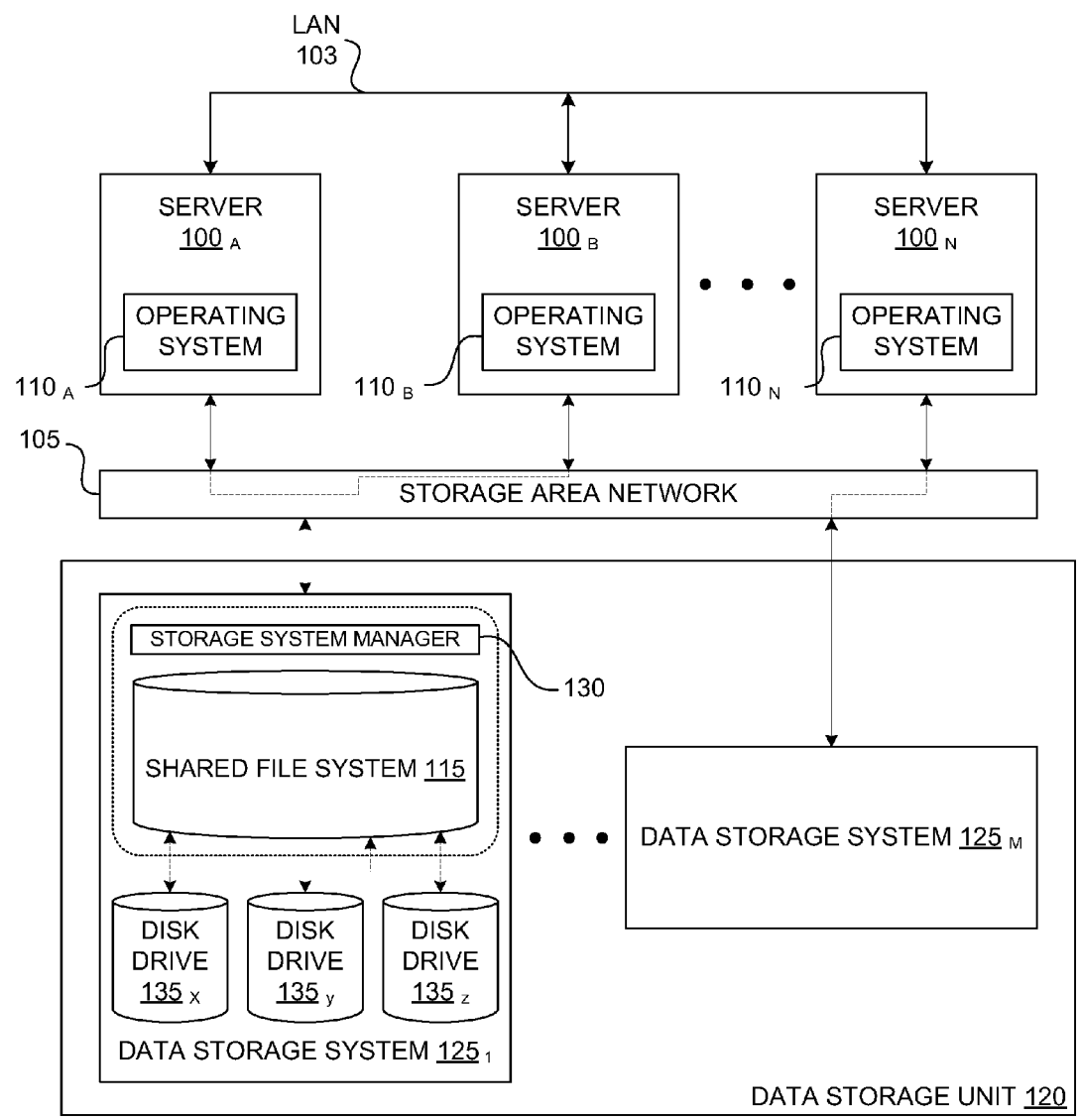
FIG. 1 illustrates a computer system configuration utilizing a shared file system in which one or more embodiments of the present invention may be implemented.

FIG. 1 illustrates a computer system configuration utilizing an SFS, also known as a cluster file system, in which one or more embodiments of the present invention may be implemented. The computer system configuration of FIG. 1 includes multiple servers $100_A$ to $100_N$, each of which is connected to storage area network (SAN) 105 and networked to one another through local area network (LAN) 103. Operating systems $110_A$ and $110_B$ on servers $100_A$ and $100_B$ interact with an SFS 115 that resides on a data storage unit (DSU) 120 accessible through SAN 105. In particular, DSU 120 is a logical unit of one or more data storage systems $125_1$ to $125_M$ (e.g., disk array) connected to SAN 105. While DSU 120 is exposed to operating systems $110_A$ and $110_B$ by storage system manager 130 (e.g., disk controller) as a contiguous logical storage space, the actual physical data blocks upon which SFS 115 may be stored is dispersed across the various physical disk drives $135_X$ to $135_Z$ of data storage system.

Data in DSU 120 (and possibly other DSUs exposed by the data storage systems) is accessed and stored in accordance with structures and conventions imposed by an SFS 115 that stores such data as a plurality of files of various types, typically organized into one or more directories. SFS 115 further includes file system management or metadata structures that store information, for example, about how data is stored within SFS 115, such as block bitmaps that indicate which data blocks in SFS 115 remain available for use, along with other metadata structures such as file descriptors or inodes for directories and files in SFS 115. In one embodiment, each of servers 100 is configured with a hypervisor to support the execution of virtual machines each having a virtual disk represented by a file within SFS 115. One example of SFS 115 is VMFS (Virtual Machine File System), which is an SFS for supporting virtual machines available from VMware, Inc. of Palo Alto, Calif.

Figure 2:
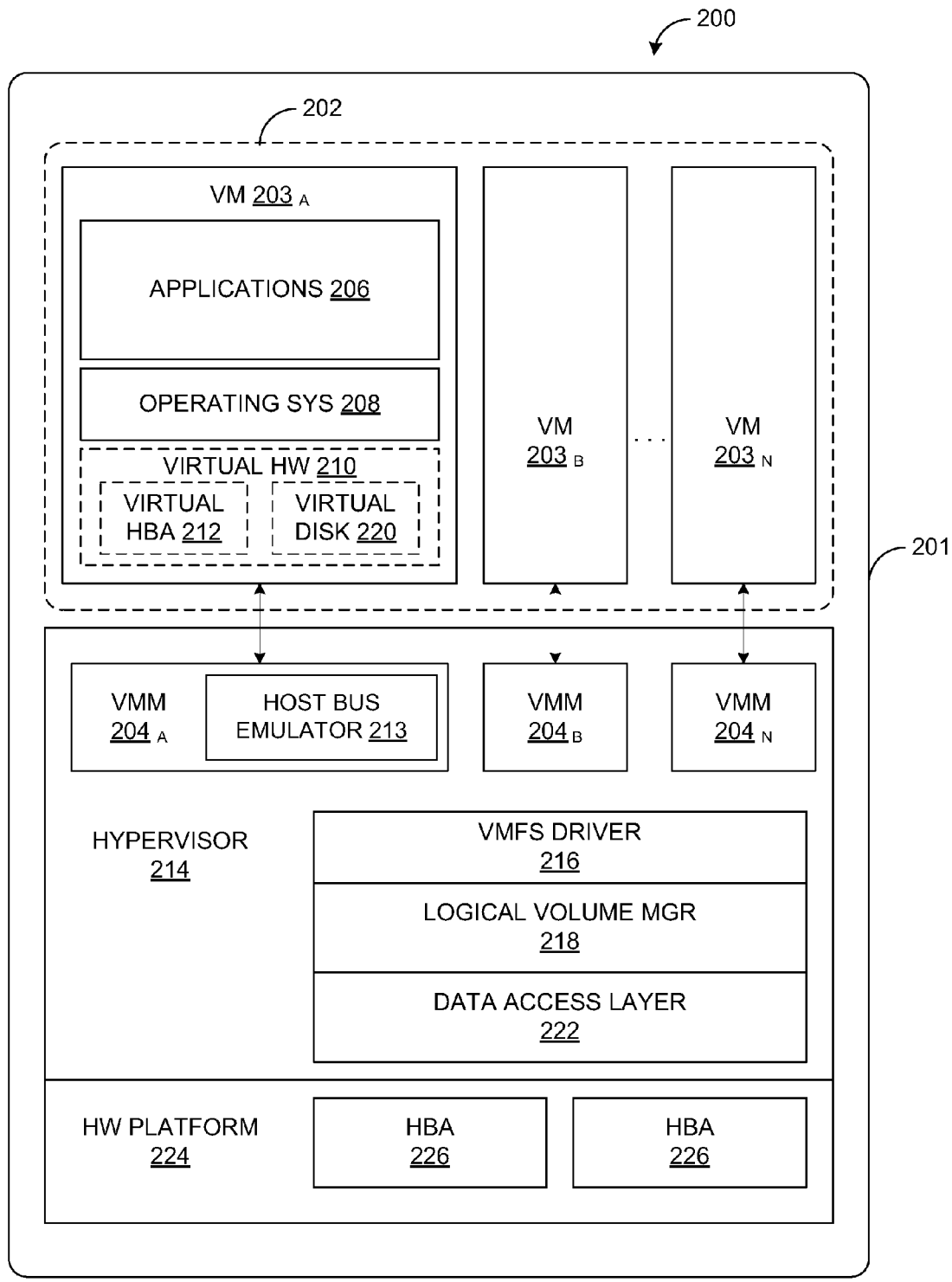
FIG. 2 illustrates a virtual machine based system in which one or more embodiments of the present invention may be implemented.

FIG. 2 illustrates a virtual machine based system 200 in which one or more embodiments of the present invention may be implemented. An integral computer system 201, generally corresponding to one of the computer system servers 100, is constructed on a conventional, typically server-class hardware platform 224, including in particular host bus adapters (HBAs) 226 in addition to conventional platform processor, memory, and other standard peripheral components (not separately shown). The hardware platform 224 executes a hypervisor 214 supporting a virtual machine execution space 202 within which virtual machines (VMs) $203_{A-N}$ are executed. In one or more embodiments of the present invention, the hypervisor 214 and virtual machines $203_{A-N}$ are implemented using the vSphere™ product developed and distributed by VMware, Inc.

In summary, the hypervisor 214 provides the necessary services and support to enable concurrent execution of the virtual machines $203_{A-N}$. In turn, each virtual machine $203_{A-N}$ implements a virtual hardware platform 210 as a conceptual layer that supports the execution of a guest operating system 208 and one or more client application programs 206. In one or more embodiments of the present invention, the guest operating systems 208 are instances of Microsoft Windows, Linux and Netware-based operating systems, or the like. Other guest operating systems can be equivalently used. In each instance, the guest operating system 208 includes a native file system layer, typically either an NTFS or ext3FS type file system layer. These file system layers interface with the virtual hardware platforms 210 to access, from the perspective of the guest operating systems 208, a data storage host bus adapter. In one implementation, the virtual hardware platform 210 implements a virtual host bus adapter 212 that emulates the necessary system hardware support to enable execution of the guest operating system 208 transparently to the virtualization of the system hardware.

File system calls initiated by the guest operating systems 208 to perform file system-related data transfer and control operations are processed and passed through the virtual host bus adapter 212 to adjunct virtual machine monitor (VMM) layers $204_{A-N}$ that implement the virtual system support necessary to coordinate operation with the hypervisor 214. In particular, a host bus emulator 213 functionally enables the data transfer and control operations to be ultimately passed to the host bus adapters 226. File system calls for performing data transfer and control operations generated, for example, by applications 206 are translated and passed to a virtual machine file system (VMFS) driver or component 216 that manages access to files (e.g., virtual disks, etc.) stored in data storage systems (such as data storage system 125) that may be accessed by any of the virtual machines $203_{A-N}$. In one embodiment, access to DSU 120 is managed by VMFS driver 216 and SFS 115 for DSU 120 is a virtual machine file system (VMFS) that represents the organization of files and directories stored in DSU 120, in accordance with structures understood by VMFS driver 216. For example, guest operating systems 208 receive file system calls and perform corresponding command and data transfer operations against virtual disks, such as virtual SCSI devices accessible through virtual HBA 212, that are visible to the guest operating systems 208. These virtual disks are maintained as files stored on VMFS, for example, in DSU 120. Each such virtual disk may be maintained as a file or set of files stored on VMFS, for example, in DSU 120. Guest operating system 208 file system calls are translated from instructions applicable to a virtual disk visible to the guest operating systems 208 to instructions applicable to a file representing the virtual disk in DSU 120 exposed by data storage system 125 to VMFS. Such translations are performed through a number of component layers of an "IO stack," beginning at the guest operating system 208 (which receives the file system calls from applications 206), through virtual HBA 212, host bus emulator 213, VMFS driver 216, a logical volume manager 218 which assists VMFS driver 216 with mapping files stored in VMFS with DSU 120 exposed by data storage systems networked through SAN 105, a data access layer 222, including device drivers, and host bus adapters 226 (which, e.g., issues a SCSI command to data storage system 125 to access DSU 120).

It should be recognized that the various terms, layers and categorizations used to describe the virtualization components in FIG. 2 may be referred to differently without departing from their functionality or the spirit or scope of the invention. For example, VMMs $204_{A-N}$ may be considered separate virtualization components between VMs $203_{A-N}$ and hypervisor 214 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 210 may be merged with and into VMMs $204_{A-N}$ such that virtual host bus adapter 212 is removed from FIG. 2 (i.e., since its functionality is effectuated by host bus adapter emulator 213).

Figure 3:
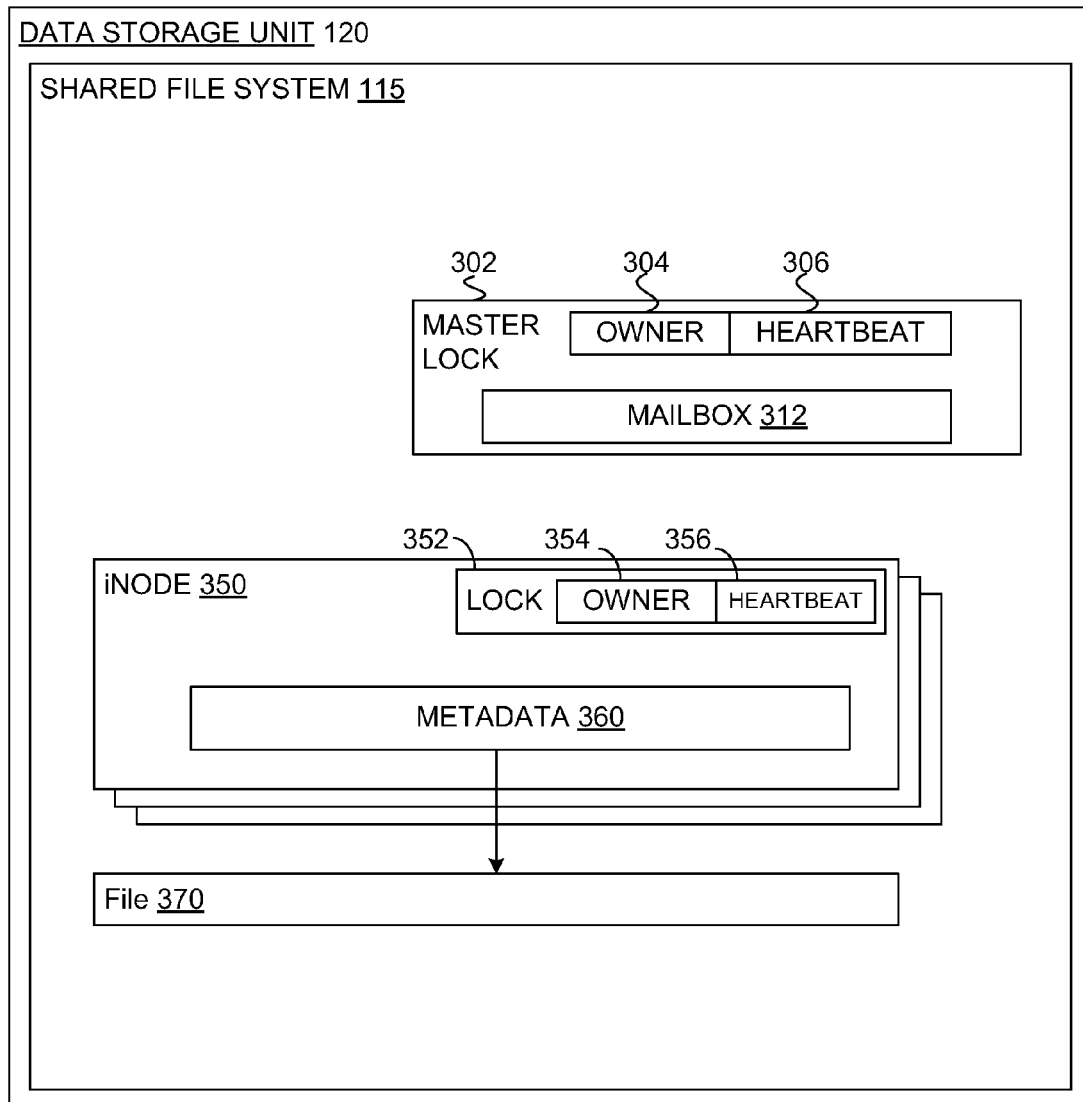
FIG. 3 illustrates a configuration for locking files to enable multiple servers to access a data storage unit concurrently, according to one or more embodiments of the present invention.

Turning now to FIG. 3, details of DSU 120 and SFS 115 are shown. As shown, SFS 115 includes a master lock 302 for SFS 115 in which an identity of a lock server according to one or more embodiments of the present invention is stored. Similar to other locks described herein—which protect inodes, bitmaps, etc.—master lock 302 prevents simultaneous modification of SFS 115, thereby preventing multiple lock servers from being elected. In one embodiment, master lock 302 includes an owner data field 304, a heartbeat data field 306, and a mailbox 312. Owner data field 304 includes an IP address of a server that is designated as the lock server. Owner data field 304 may contain a zero or some other special value to indicate that no server currently owns master lock 302. Heartbeat data field 306 is referenced by the lock server and is used to indicate whether or not the lock server is active or inactive. Locks that are managed using heartbeats maintained in a heartbeat region are detailed in U.S. patent application Ser. No. 11/676,109, which is incorporated by reference herein.

Mailbox 312 may be used to allow each of servers 100 to communicate with the lock server when any of servers 100 experiences a network partition over LAN 103. Specifically, there is only one mailbox 312 per file system and the lock server has ownership of the one mailbox 312. In one embodiment, mailbox 312 is implemented using a data structure that includes a plurality of rows, where each row stores a time value, a subject, and a message. Servers 100 may read and/or write messages to the mailbox 312 to communicate information to the designated lock server when they experience a network partition over LAN 103.

SFS 115 also includes inodes 350 for files and directories stored in SFS 115. Each inode 350 includes metadata 360 that may include, among other things, block information that identifies data blocks to which inode 350 refers, such as physical blocks within SFS 115 that store data for a file or directory. In addition to metadata 360, each inode 350 is associated with a lock 352. Lock 352 governs access to the underlying data of a file or directory associated with inode 350. Lock 352 comprises an owner data field 354 and a heartbeat field 356. Owner data field 354 contains the same type of information as owner data field 304, and heartbeat data field 356 contains the same type of information as heartbeat data field 306.

One or more embodiments of the present invention provide a fine-granularity locking scheme within SFS 115 that minimizes use of SCSI primitives. As a first step in this scheme, one of servers 100 assigns itself as a lock server by updating owner data field 304 of master lock 302 with its own IP address. This assignment is accomplished using, for example, SCSI reservation primitives that allow one of servers 100 to atomically interact with SFS 115. Upon assignment of a lock server, however, communication between servers 100 and SFS 115 is facilitated by the lock server, not the use of primitives. More specifically, any server that performs an IO operation on a file residing in SFS 115 reads owner data field 304 of master lock 302 at least once to determine the IP address of the lock server, and issues a lock request to the lock server whenever it needs to perform an IO operation on a file residing in SFS 115. The lock server receives the lock request through LAN 103 and responds by indicating that the file is either now successfully locked for use by the requesting server—which is accomplished by inserting, into the master lock 302, information associated with the requesting server—or, that the file is currently locked by another server. Assuming that the request to lock the file is granted, the requesting server may subsequently proceed with the IO operation. When the IO operation has completed, and if no additional IO operations are to be performed to the file, the requesting server notifies the lock server and releases the lock to the file. In the event that the lock server becomes inaccessible to servers 100 due to, for example, the lock server experiencing a failure, or a network partition, servers 100 take corrective actions which are further described below.

Figure 4:
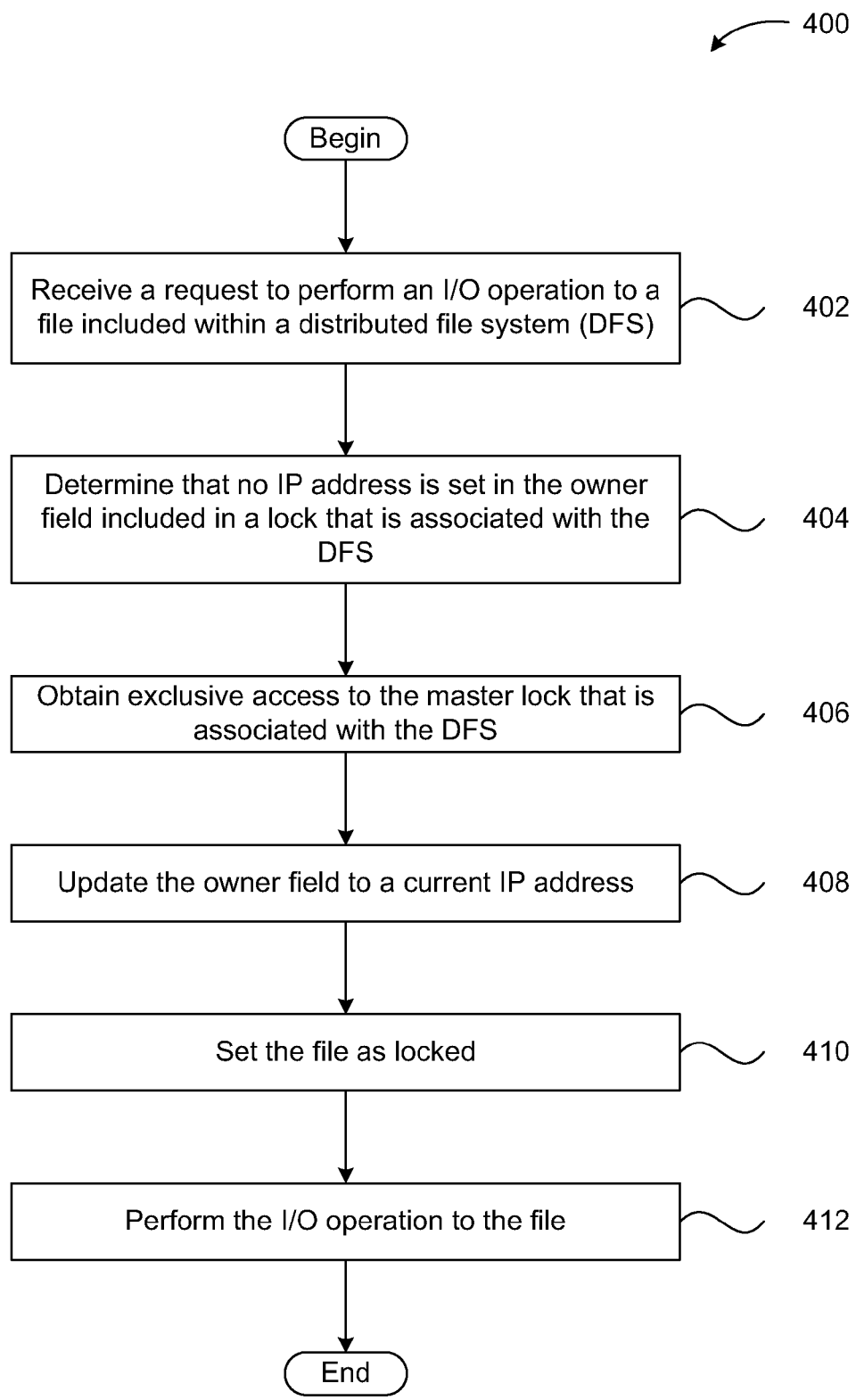
FIG. 4 is a flow diagram of method steps for designating a server as a lock server when no lock server is designated, according to one or more embodiments of the present invention.

FIG. 4 is a flow diagram of method steps 400 for designating a server as a lock server when no lock server is designated, according to one or more embodiments of the present invention. Although the method steps are described in conjunction with the systems of FIGS. 1-2, persons skilled in the art will understand that any system configured to perform the method steps is within the scope of the invention.

Method 400 begins at step 402, where one of servers 100 receives a request to perform an IO operation to a file of SFS 115. For example, an application executing within server $100_A$ may issue a write request to update a file of SFS 115. At step 404, server $100_A$ determines that no server IP address is set in owner data field 304 of master lock 302. For example, if LAN 103 implements TCP/IP protocol, an owner data field 304 that stores a value of "0.0.0.0" would indicate that none of servers 100 have been designated as a lock server. At step 406, server $100_A$ obtains exclusive access to master lock 302. Server $100_A$ may obtain this exclusive access by, for example, issuing a SCSI-2 reserve command to SFS 115. Details of this technique may be found in U.S. patent application Ser. No. 11/676,109. Upon getting the exclusive access, at step 408, server $100_A$ updates owner data field 304 of master lock 302 to an IP address associated with server $100_A$ and, optionally, the heartbeat address data field 306 with data associated with server $100_A$. Next, at step 410, server $100_A$ sets the file as locked by updating a lock 352 that corresponds to the file. Then, at step 412, server $100_A$ executes the IO operation to the file of SFS 115. After server $100_A$ has been successfully designated as the lock server, server $100_A$ is required to update its heartbeat either directly in heartbeat data field 306 or in a heartbeat region referenced by a pointer stored in heartbeat data field 306 at a timed interval so that the other servers can determine that the lock server is active.

Figure 5A:
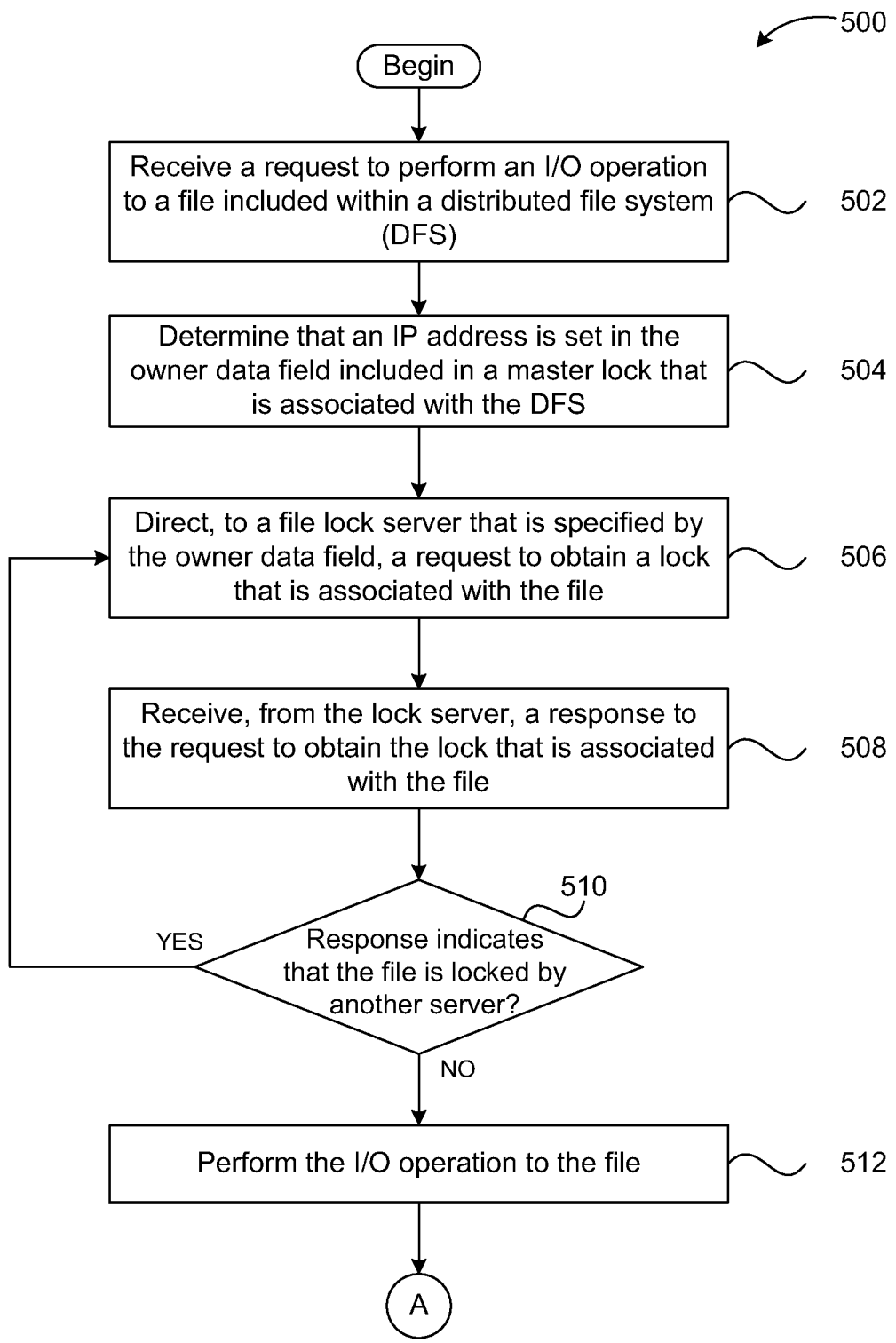
FIGS. 5A-5B is a flow diagram of method steps for performing an IO operation to a file when a lock server has been designated, according to one or more embodiments of the present invention.
Figure 5B:
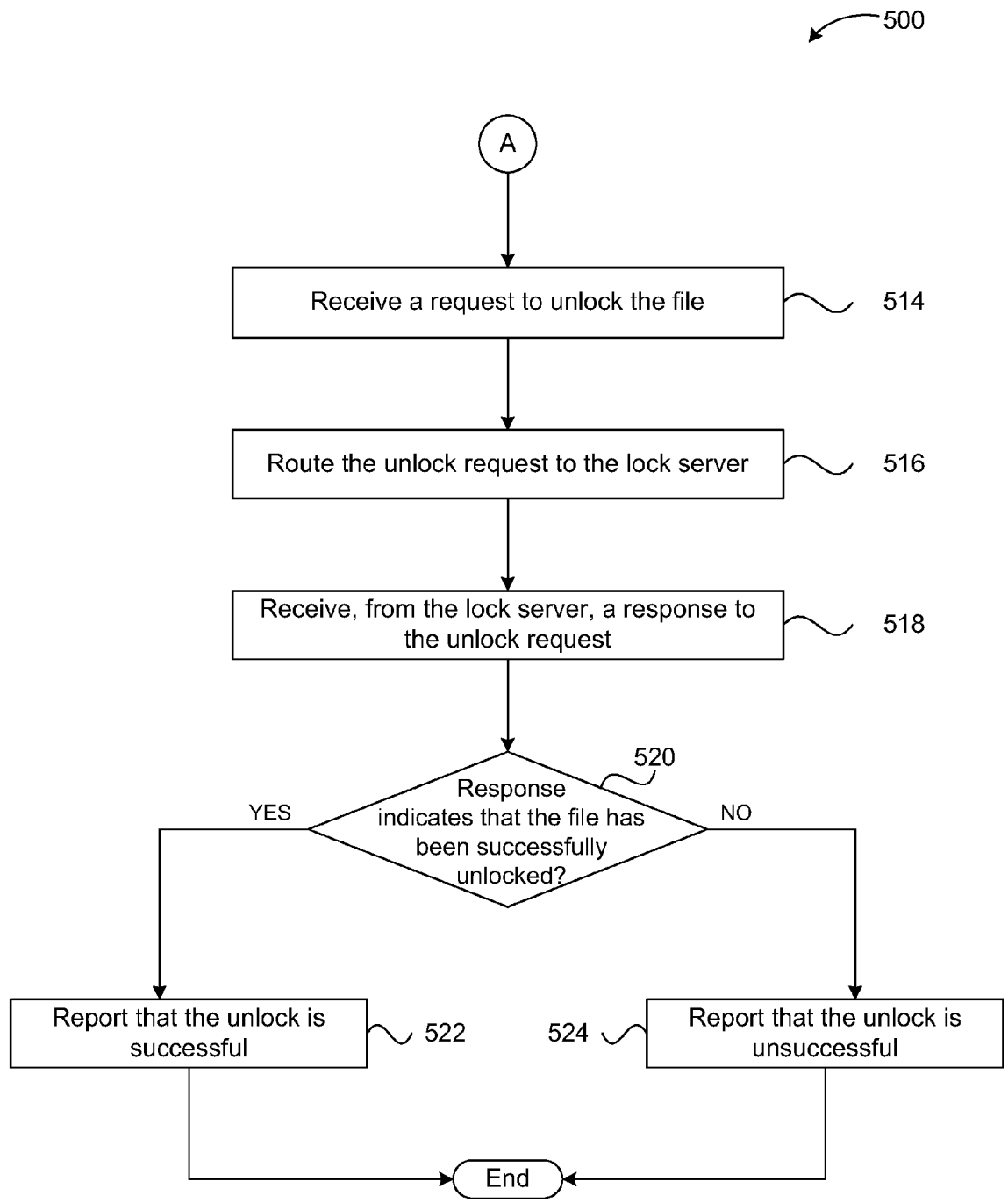

FIGS. 5A-5B is a flow diagram of method steps 500 for performing an IO operation to a file when a lock server has been designated, according to one or more embodiments of the present invention. Although the method steps are described in conjunction with the systems of FIGS. 1-2, persons skilled in the art will understand that any system configured to perform the method steps is within the scope of the invention.

Method 500 begins at step 502, where one of servers 100, e.g., server $100_B$, receives a request to perform an IO operation on a file of SFS 115, similar to step 402 in FIG. 4 described above. At step 504, server $100_B$ determines that owner data field 304 of master lock 302 includes a non-zero entry; however, the server $100_B$ may optionally use a cache to optimize the performance of this determining step. For example, owner data field 304 may store a value of "192.168.1.1" to signify an IP address of server $100_A$ indicating that server $100_A$ has been designated as the lock server. At step 506, server $100_B$ directs, to the lock server that is identified in owner data field 304, a request to obtain a lock 352 that is associated with the file upon which the IO operation is to be performed. In one embodiment, server $100_B$ generates a TCP/IP message directed to the IP address stored in owner data field 304, where the payload of the TCP/IP message includes information associated with the file. Accordingly, this TCP/IP message is transmitted from server $100_B$ to the lock server through LAN 103. At step 508, server $100_B$ receives, from the lock server, a response to the request to obtain the lock to the file through LAN 103. At step 510, server $100_B$ determines whether the response indicates that the file is locked by another server. If, at step 510, server $100_B$ determines that the response indicates that the file is locked by another server, step 506 is repeated, or a "lock not free" message is returned to upper layers, e.g. an application requesting the lock 352. Otherwise, the lock server inserts information associated with server $100_B$ (e.g., the IP address of server $100_B$) into owner data field 354 and heartbeat field 356 of the lock associated with the file and method 500 proceeds to step 512. At step 512, server $100_B$ performs the IO operation on the file. At step 514, server $100_B$ receives a request to unlock the file. Optionally, server $100_B$ may be configured to reference a cache to determine whether a connection to the lock server or file is in an active state. At step 516, server $100_B$ routes the unlock request to the lock server. At step 518, server $100_B$ receives, from the lock server, a response to the unlock request. At step 520, server $100_B$ determines whether the response indicates that the file has been successfully unlocked by the server. Subsequently, step 522 or step 524 follows, depending on whether the file was successfully unlocked by the server.

Figure 6:
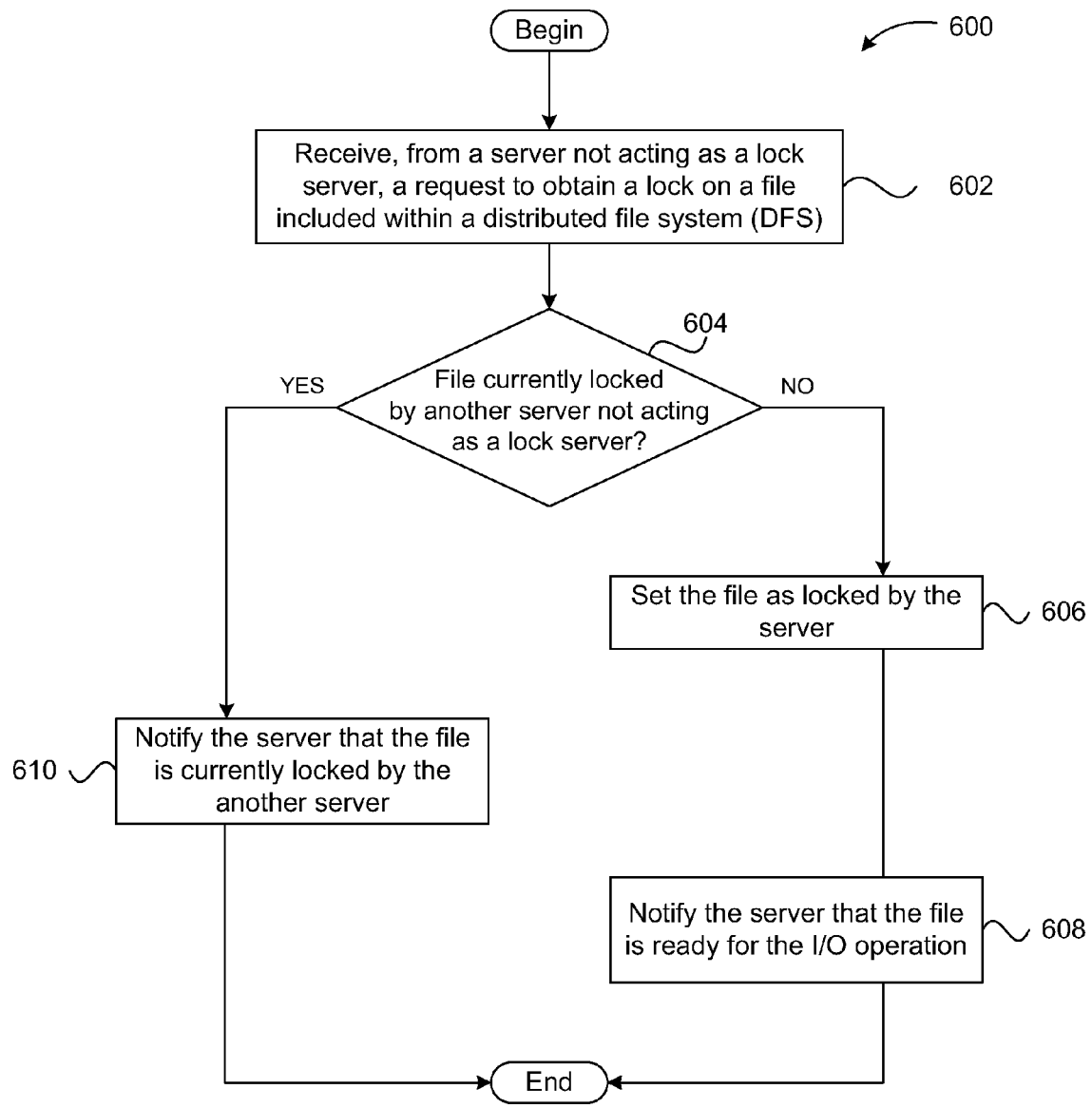
FIG. 6 is a flow diagram of method steps carried out by a lock server to issue locks to servers that submit lock requests, according to one or more embodiments of the present invention.

FIG. 6 is a flow diagram of method steps 600 carried out by a lock server to issue locks to servers 100 that are submitting lock requests, according to one or more embodiments of the present invention. Although the method steps are described in conjunction with the systems of FIGS. 1-2, persons skilled in the art will understand that any system configured to perform the method steps is within the scope of the invention.

Method 600 begins at step 602, where a lock server, e.g., server $100_A$, receives a request to obtain a lock to a file of SFS 115. For example, an application executing on server $100_C$—a server not acting as the lock server—may request the lock so that it can perform IO operations on a file of SFS 115. At step 604, the lock server determines whether the file is currently locked. To make this determination, the lock server reads the lock 352 associated with the file of SFS 115 and parses owner field 354 of the lock 352. In one embodiment, the lock server includes a cache that stores information that the lock server has previously read from or written to locks to files of SFS 115. If, at step 604, the lock server determines that the file is not currently locked, then the method proceeds to step 606. At step 606, the lock server writes information associated with server $100_C$ into owner data field 354 and heartbeat field 356. At step 608, the lock server notifies server $100_C$ through LAN 103 that the file is now locked for use by server 100.

Referring now back to step 604, if the lock server determines that the file is locked by another server not acting as the lock server, e.g., server $100_B$, then the method proceeds to step 610, where the lock server notifies server $100_C$ through LAN 103 that the file is currently locked by another server. Subsequently, server $100_C$ repeatedly submits a lock request to the lock server over LAN 103 until the lock to the file becomes available, or a "lock not free" message is returned to upper layers.

Figure 7:
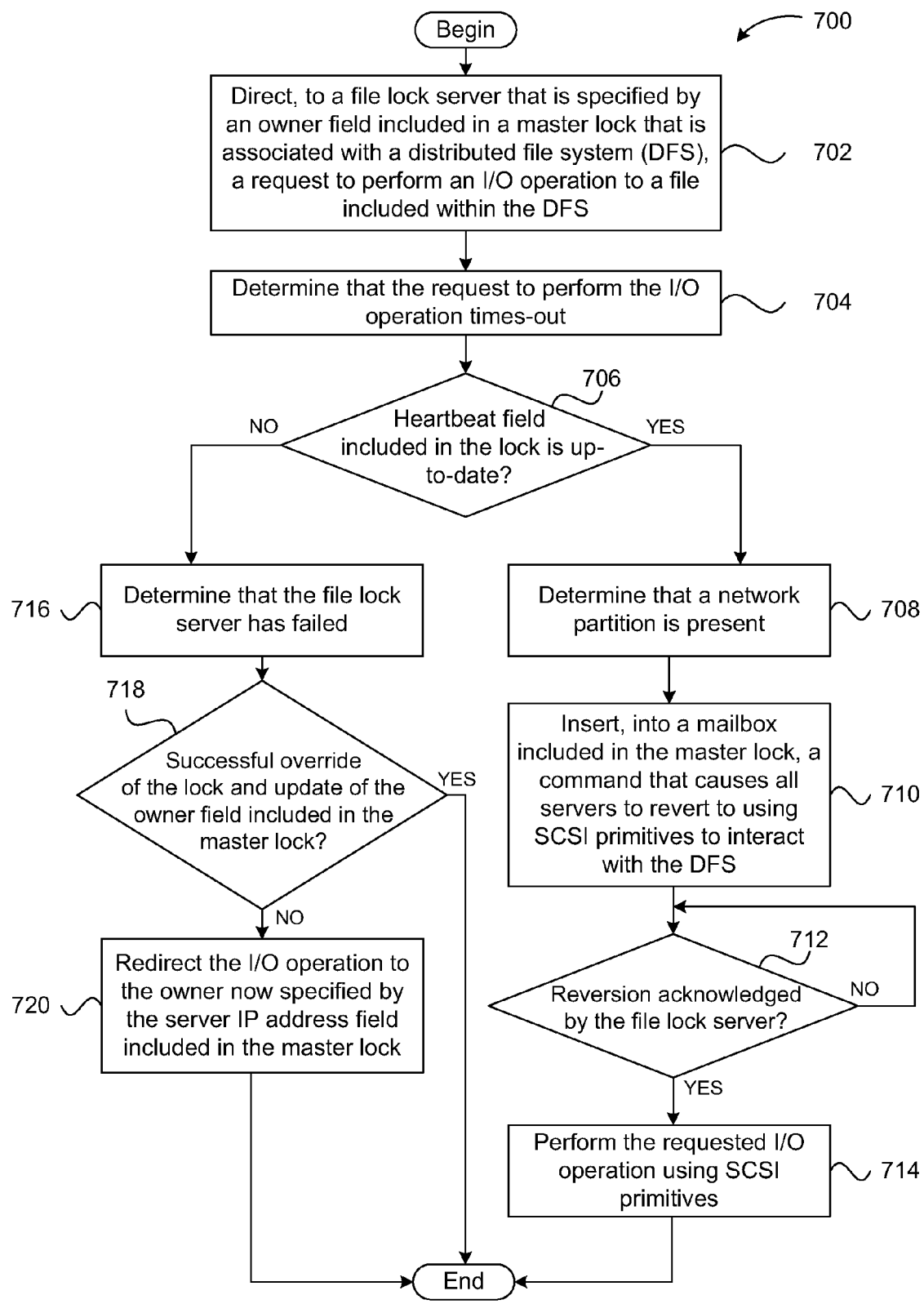
FIG. 7 is a flow diagram of method steps for determining and responding to a lock server failure or a network partition, according to one or more embodiments of the present invention.

FIG. 7 is a flow diagram of method steps 700 for determining and responding to a lock server failure or a network partition, according to one or more embodiments of the present invention. Although the method steps are described in conjunction with the systems of FIGS. 1-2, persons skilled in the art will understand that any system configured to perform the method steps is within the scope of the invention.

Method 700 begins at step 702, where a server 100, e.g., server $100_B$, submits a request to lock a file residing within SFS 115. As previously described, such a request is directed to the lock server through LAN 103. At step 704, server $100_B$ determines that the request has timed-out, e.g., if the lock server fails to respond to the lock request within a predetermined threshold. At step 706, server $100_B$ examines the heartbeat of the lock server, either by examining the heartbeat data field 306 of master lock 302 or heartbeat region referenced by a pointer stored in heartbeat data field 306 of master lock 302, as the case may be. If, at step 706, server $100_A$ determines that the heartbeat of the lock server is up-to-date, then method 700 proceeds to step 708.

At step 708, server $100_B$ determines that it is experiencing network partition, because it is unable to communicate with the lock server over LAN 103 although the heartbeat of the lock server is up-to-date. Such a partition may occur, for example, if a network card or a network cable fails to operate properly. Under this condition, servers 100 need to revert back to a non-network based lock management technique, such as those based on SCSI-2 reserve/release primitives, as described in detail in U.S. patent application Ser. No. 11/676, 109. To initiate the reversion process, the server experiencing the network partition (server $100_B$ in this example), at step 710, inserts a message, using e.g. SCSI-based primitives, in mailbox 312 of master lock 302 to request to revert to the non-network based lock management technique. At step 712, server $100_B$ waits for confirmation/acknowledgement that the lock server has received this message. Similarly, the locker server can confirm/acknowledge the receipt of the message by using SCSI-based reservations to write to mailbox 312.

Additionally, and while the server $100_B$ waits, the lock server reverts to performing SCSI-based reservations to grant locks on behalf of the servers 100 that have not yet detected the network partition. Upon such confirmation/acknowledgement, at step 714, server $100_B$ performs any IO operations using the non-network based lock management technique (e.g., by issuing SCSI primitives).

Referring back now to step 706, if server $100_B$ determines that the heartbeat of the lock server is not up-to-date, then method 700 proceeds to step 716. At step 716, it is determined that the lock server has failed and server $100_B$ carries out, at step 718, an attempt to designate itself as the lock server. At step 718, server $100_B$ attempts to override master lock 302 and update owner data field 304 with information that is associated with server $100_B$. Failure of this attempt indicates that another server 100 has already assigned itself as the lock server. However, if the master lock 302 is overridden, and the owner data field 304 is updated, the server $100_B$ has successfully assigned itself as the lock server, and the method ends. As shown in step 720, any subsequent lock requests are directed to server $100_B$ over LAN 103. Details of reclaiming ownership of a lock server can be found in U.S. patent application Ser. No. 11/676,109, which discloses a technique that prevents two or more servers from designating themselves as the new lock server. In addition, the steps 702-704, as described above, are repeated to determine whether a network partition persists.

The embodiments described herein employ a single lock server for managing locks in an SFS for a group of hosts. In alternative embodiments, multiple lock servers, each managing locks for a subset of files on the SFS may be used. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer.

Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of managing locks in a shared file system (SFS) for a group of hosts, including first and second hosts, that are coupled to one or more storage arrays through a first network and to each other through a second network, comprising:
   when the first host determines that there is no host ID written in a predetermined storage location in the storage arrays, obtaining, by said first host, exclusive access to the predetermined storage location, and writing, by said first host, a host ID of the first host in the predetermined storage location to identify the first host as a server for managing locks;
   at each of the other hosts including the second host, reading the predetermined storage location to obtain the host ID of the first host and communicating with the first host over the second network to obtain one or more locks to files of the SFS;
   determining, by the second host, that the first server is inactive; and
   responsive to the determining by the second host,
   overriding, by the second host, the exclusive access to the predetermined storage area obtained by the first host and
   writing, by the second host, a host ID of the second host in the predetermined storage location to identify the second host as the server for managing locks.

2. The method of claim 1, further comprising:
   at said server for managing locks, receiving a lock request from a host over the second network and granting the lock request if the lock is not currently held by another host.

3. The method of claim 2, wherein granting the lock request includes writing a host ID of the requesting host in a data structure for the lock.

4. The method of claim 1, further comprising:
   at said server for managing locks, checking a cache of locks that have been granted, and granting or rejecting the lock request based on contents of the cache.

5. The method of claim 1, wherein the second host determines that the first server is inactive by
   examining a liveness information of the first server and determining that the liveness information of the first server has not been updated within a predetermined period of time.

6. The method of claim 1, further comprising:
   when one of the other hosts determines that its communication with said server for managing locks over the second network has failed, posting a message in a data structure owned by said server for managing locks to employ an alternative locking technique that does not rely on communications with said server for managing locks over the second network.

7. The method of claim 6, wherein said server for managing locks, in response to seeing the message in the data structure that it owns, posts a confirmation message to confirm use of the alternative locking technique.

8. The method of claim 7, further comprising:
   after one of the other hosts has determined that its communication with said server for managing locks over the second network has failed, periodically communicating with said server for managing locks over the second network, and upon successful reconnection with said server for managing locks over the second network, reverting back to the locking technique that relies on communications with said server for managing locks over the second network.

9. In a computer system having a group of hosts that are coupled to one or more storage arrays through a first network and to each other through a second network, wherein files stored in the storage arrays are managed using a shared file system (SFS) for the hosts, a method carried out by a host to determine an identity of a server for managing locks for the SFS, comprising:
   checking a predetermined storage location in the storage arrays to determine whether or not there is a host ID written in the predetermined storage location;
   if there is no host ID written in the predetermined storage location, obtaining exclusive access to the predetermined storage location, and writing a host ID of said host in the predetermined storage location to identify said host as said server for managing locks; and
   if there is a host ID written in the predetermined storage location, then:
   determining whether said server for managing locks is inactive;

if said server for managing locks is inactive, overriding an exclusive access to the predetermined storage area previously obtained by said server for managing locks and writing the host ID of said host in the predetermined storage area to identify said host as said server for managing locks; and if said server for managing locks is not inactive, storing the host ID of said server for managing locks in a local memory of said host.

10. The method of claim 9, wherein obtaining exclusive access to the predetermined storage area comprises obtaining a lock to the SFS.

11. The method of claim 10, wherein the lock is obtained using a SCSI reservation protocol.

12. The method of claim 9, wherein determining that said server for managing locks is inactive comprises:

examining a liveness information of said server for managing locks; and determining that the liveness information of said server for managing locks has not been updated within a predetermined period of time.

13. The method of claim 9, further comprising:

invalidating the host ID stored in the local memory of said host; and reading a new host ID of said server for managing locks from the predetermined storage location and storing the new host ID of said server for managing locks in the local memory of said host.

14. The method of claim 9, further comprising:

receiving a request to perform an IO operation to a file of the SFS; and submitting a request for a lock to said file to said server for managing locks over the second network.

15. A non-transient computer readable medium comprising instructions that are to be executed in a host that is part of a computer system having a group of hosts that are coupled to one or more storage arrays through a first network and to each other through a second network, wherein files stored in the storage arrays are managed using a shared file system (SFS) for the hosts, and wherein the instructions, when executed in said host, cause said host to carry out the steps of:

checking a predetermined storage location in the storage arrays to determine whether or not there is a host ID written in the predetermined storage location;

if there is no host ID written in the predetermined storage location, obtaining exclusive access to the predetermined storage location and writing a host ID of said host in the predetermined storage location to identify said host as a server for managing locks; and if there is a host ID written in the predetermined storage location, then:

determining whether said server for managing locks is inactive;

if said server for managing locks is inactive, overriding an exclusive access to the predetermined storage area previously obtained by said server for managing locks and writing the host ID of said host in the predetermined storage area to identify said host as said server for managing locks; and if said server for managing locks is not inactive, storing the host ID of said server for managing locks in a local memory of said host.

16. The non-transient computer readable medium of claim 15, wherein obtaining exclusive access to the predetermined storage area comprises
obtaining a lock to the predetermined storage location.

17. The non-transient computer readable medium of claim 16, wherein the lock is obtained using a SCSI reservation protocol.

18. The non-transient computer readable medium of claim 15, wherein determining that said server for managing locks is inactive comprises examining a liveness information of said server for managing locks; and determining that the liveness information of said server for managing locks has not been updated within a predetermined period of time.

19. The non-transient computer readable medium of claim 15, further comprising instructions, which when executed in said host, cause said host to carry out the steps of:

invalidating the host ID stored in the local memory of said host; and reading a new host ID of said server for managing locks from the predetermined storage location and storing the new host ID of said server for managing locks in the local memory of said host.

20. The non-transient computer readable medium of claim 15, further comprising instructions, which when executed in said host, cause said host to carry out the steps of:

receiving a request to perform an IO operation to a file of the SFS; and submitting a request for a lock to said file to said server for managing locks over the second network.

* * * * *